(No Model.)
E. ANDERSON.
MECHANICAL MOVEMENT.
No. 271,295. Patented Jan. 30, 1883.
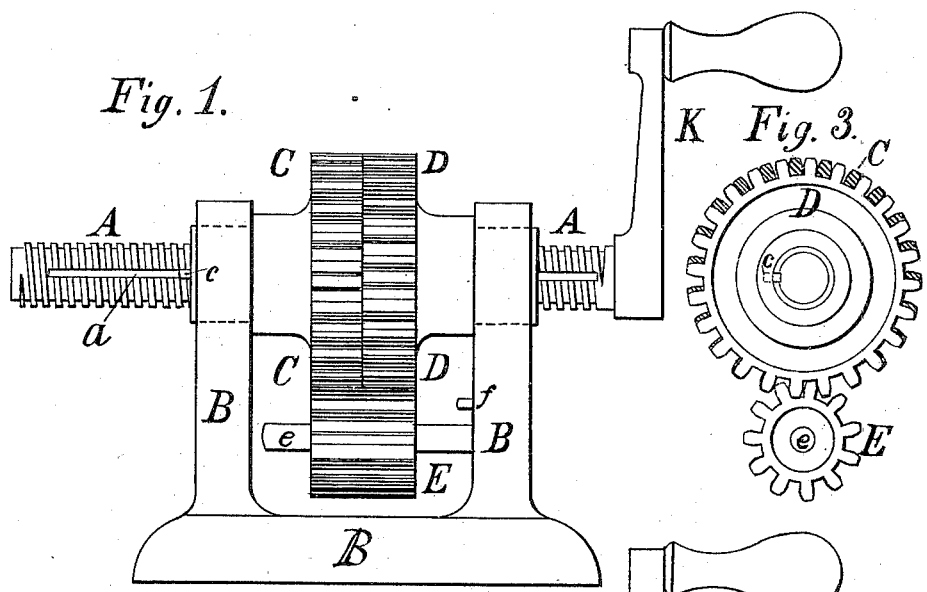
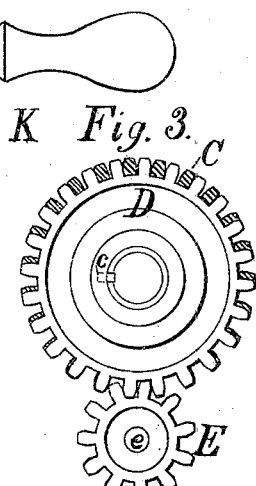
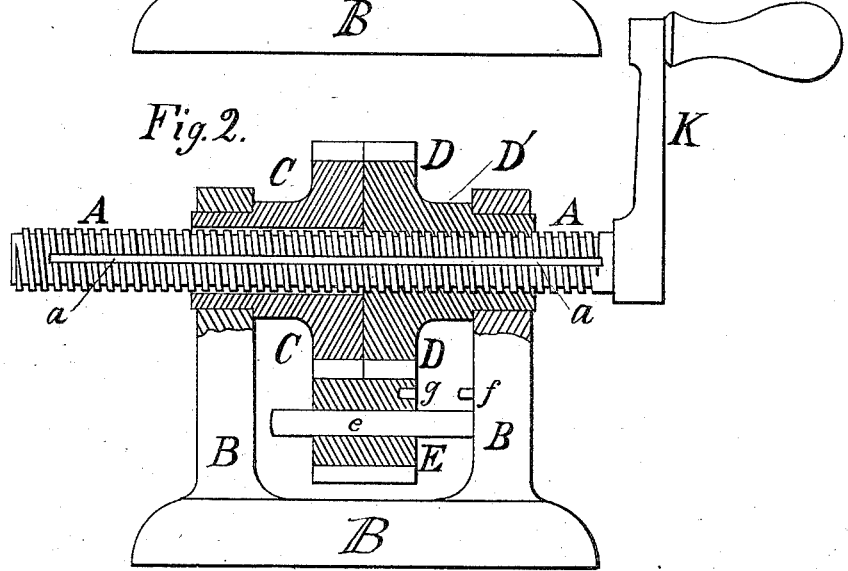
Witnesses:
D W Travis
Franklin Couch
Inventor.
Euclid Anderson

UNITED STATES PATENT OFFICE.

EUCLID ANDERSON, OF PEEKSKILL, NEW YORK.

MECHANICAL MOVEMENT.

SPECIFICATION forming part of Letters Patent No. 271,295, dated January 30, 1883.

Application filed November 21, 1882. (No model.)

*To all whom it may concern:*

Be it known that I, EUCLID ANDERSON, of Peekskill, county of Westchester and State of New York, have invented a new and useful form of Mechanical Movement, which is fully set forth in the following specification.

This invention relates to a combination of a screw and differential gear, whereby either a rapid or a very slow movement of the screw through its nut may at will be effected.

The object of the invention is to make compact and simple the mechanism by which the above result is obtained.

The movement is capable of a variety of applications, among which may be named the screw-feed of a drill or lathe, the screw of a letter-press, and in many places where a slow and powerful movement of a screw in one direction and a rapid movement in the opposite direction are desired.

In the drawings, Figure 1 is a side elevation of a device embodying this invention. Fig. 2 is a partly sectional view of the same elevation as Fig. 1. Fig. 3 is an end view of the gearing.

B B B is a frame, consisting of a base and two standards. C and D are toothed wheels, each having a bearing in one of the standards, the bearings being so placed that the axes of both wheels coincide. The wheel D is hollow and threaded, so as to receive the screw A, the wheel forming a nut to the latter. The wheel C is also hollow, but sufficiently large to pass freely over the thread of the screw A. This wheel is provided with a feather, c, that enters a groove, a, on the screw, so that one cannot turn without turning the other, yet allows of a free longitudinal movement of the screw through the wheel. The screw is turned by the crank k, or it may be driven by the wheel C. The toothed portions of the wheels C and D are of the same diameter and lie adjacent to each other, as shown, and both engage with a pinion, E, whose width equals the width of both C and D. E revolves on the stationary pin e, which is supported by the standard B. It can be seen, now, that if C and D contain an equal number of teeth, and they engage with E, revolutions of the crank will not move the screw A either way in the nut D'; but if the wheel D is made to contain one tooth less than C it will have a retrograde movement in relation to C, and the screw will be slowly moved to the left or the right, according to the direction of rotation of screw. The pinion E is made capable of a longitudinal movement on its support e, so that it may be thrown out of gear with one of the wheels, C, and just as it becomes disengaged with C it engages with and is locked by the stationary pin f, which enters cavity g. In this position of the parts the wheel C alone can revolve when the screw is turned, and as the wheel D, forming the nut, is held stationary, the screw is moved a distance equal to its pitch at every revolution. If the wheel C contains twenty-four teeth and D twenty-three teeth, each turn of the screw, when both wheels engage with the pinion, will advance it only the twenty-fourth part of its pitch. Evidently the number of teeth can be so increased as to give a very much finer movement of the screw, or lessened to give a coarser movement than here shown. A difference of one or two teeth in the wheels does not materially interfere with their engaging with the pinion E. The pinion may be shifted back and forth in various well-known ways.

It can now be seen that the principle of this device is capable of many applications. In a letter-press, before referred to, E and C would be disengaged until the moment pressure was wanted; then by throwing in the pinion great pressure, with even a short crank, could be obtained. As a drill-feed, the pinion would be in gear with C while drilling, but out of gear when withdrawing the drill, &c.

I am aware that differential gearing of the character shown is no new thing.

I claim—

1. The combination of the differential gearing C D E, the nut D', and screw A, all operating together substantially as shown and described.

2. In combination, the differential gearing consisting of the wheel C, having a feather, c, or other suitable device, to insure its revolving with the screw, the wheel D, the hub of which is threaded, the pinion E, capable of a sliding movement, as described, and the screw A, fitting into the nut D', substantially as shown and described.

EUCLID ANDERSON.

Witnesses:
FRANKLIN COUCH,
D. W. TRAVIS.